US006477482B1

(12) United States Patent
Maupin et al.

(10) Patent No.: US 6,477,482 B1
(45) Date of Patent: Nov. 5, 2002

(54) POWER BUTTON CONTROLLED DIAGNOSTIC MODE FOR AN INFORMATION APPLIANCE

(75) Inventors: Patrick E. Maupin, Austin; David F. Tobias, Pflugerville, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/542,745

(22) Filed: Apr. 4, 2000

(51) Int. Cl.[7] .............................................. G06F 13/10
(52) U.S. Cl. ......................................... 702/183; 702/36
(58) Field of Search ............................ 702/183, 33, 35, 702/36, 81, 84, 123, 120, 182, 184, 185

(56) References Cited

U.S. PATENT DOCUMENTS 4,297,029 A  * 10/1981  Carlson ....................... 355/133
5,313,468 A  *  5/1994  Hoshi et al. .................. 714/36

OTHER PUBLICATIONS

*Legacy I/O Removal to Advance the PC Architecture*, Microsoft Corporation, <http://www.microsoft.com/hwdev/NewPC/legacyIO.htm>, © 1999.
*New PC Design: Legacy Free and Easy to Use*, Microsoft Corporation, <http://www.microsoft.com/hwdev/newpc/>, © 1999–2000.

* cited by examiner

*Primary Examiner*—Marc S. Hoff
*Assistant Examiner*—Edward Raymond
(74) *Attorney, Agent, or Firm*—Akin Gump Strauss Hauer & Feld LLP

(57) ABSTRACT

A system adds functionality to a power button where use of the power button controls the entry and exit from a diagnostic mode. The system includes an information appliance connected to a diagnostic appliance. Once an information appliance is powered up, the information appliance monitors its power button for a press which indicates a request to enter a diagnostic mode. Absent a press of the power button, the system continues to be under control of the information appliance and never enters a diagnostic mode. However, if a press of the power button is detected, the system enters a diagnostic mode. Once in a diagnostic mode the system provides an exit therefrom by interpreting a power button press as a request to exit. The window of time to make such an exit closes once the diagnostic appliance achieves communication with the information appliance. If the power button is pressed during this window of time, then the system ends its diagnostic mode and control of the system returns to the information appliance. If the power button is pressed after the window of time has closed, then the diagnostic appliance retains control of the information appliance and maintains its ability to execute diagnostic type commands thereon. The illustrative system is particularly useful when incorporated into devices with limited interface connections such as legacy-free information appliances. The system allows for a standard existing button on the information appliance to serve diagnostic purposes, avoiding the need for initializing peripherals requiring substantial execution space.

37 Claims, 2 Drawing Sheets

POWER BUTTON CONTROLLED DIAGNOSTIC MODE FOR AN INFORMATION APPLIANCE

BACKGROUND OF THE INVENTION

1. Field of the Invention

The invention relates to the utilization of a power button of an information appliance to control the entry and exit into a diagnostic mode within a system comprised of an information appliance connected to a diagnostic information source.

2. Description of the Related Art

Personal Computer (PC) manufacturers have long been concerned with customer satisfaction. Manufacturers have learned customer satisfaction can be increased by reducing the number of required outside technician service calls. As a result, PC manufacturers have continued to pursue PC designs which reduce such service calls.

Historically, Read Only Memory (ROM) has not been in-system updateable. ROM has generally required the assistance of outside technicians to update its contents. ROM typically holds the initialization code, operating system code and related data. The Basic Input/Output System (BIOS), part of the initialization code, is usually located in the ROM. Over the years, as system enhancements and upgrades became common, the desirability of an updateable ROM has increased. Early on, the need for an in-system updateable ROM was addressed by the introduction of Electrically Erasable Programmable Read Only Memory (EEPROM). EEPROM is a non-volatile memory that is programmable and erasable by the means of an electronic pulse. Typically, such in-system updateable ROM could be updated from a variety of sources including removable media devices, modem links, or parallel or serial connectors. Although EEPROMs resolved the problem of providing an in-system updatable memory, the EEPROM technology has since been superceded by the introduction of Flash ROM. Flash ROM offers the advantages of both a block erase and a generally quicker programming than standard EEPROMs.

A problem with Flash ROMs, as well as updateable ROMs in general, is the potential that a BIOS might be corrupted when the BIOS is flashed. A BIOS might be corrupted, for example, if power was interrupted during the flashing process. In such a case, the PC would be unable to boot because its BIOS instructions would no longer be correct. To avoid this problem, it has become common practice to divide the Flash ROM memory into two sections, the boot block and the main block. The main block gets flashed while the boot block section is protected and therefore is not corrupted when a flash lays down a corrupted image. The boot block, therefore, can be used to store and protect kernel code that holds initialization code sufficient to boot the basic components of a system.

The code executed in the boot block is not the same in all PCs. The recent push by the computer industry to transition from a legacy to a legacy-free type design has significantly impacted the BIOS and the boot block. The computer industry has moved towards the new legacy-free design to avoid the limitations inherent with the legacy design, including its limited bandwidth and configuration inflexibility. The move to a legacy free configuration has meant the elimination of many elements of the old legacy PC architecture, including both hardware and firmware interfaces. A key difference between the legacy and the legacy-free configurations can be found in their interfaces.

The legacy interfaces are described as "nondeterministic" while legacy-free interfaces are considered "deterministic."

Legacy interfaces are considered "nondeterministic" because the operating system cannot guarantee correct installation of devices. There exists little or no ability for hardware enumeration to allow the operating system to configure and control the devices. Typically, the user is required to manually define settings in the BIOS or actually manipulate switches on the hardware to change configurations settings. Legacy-free ports and buses are considered "deterministic", on the other hand, because the operating system can know and manage the installation, configuration, and control of the buses and devices. Deterministic components are easy to install, and the operating system can configure devices without resource conflicts and without requiring the user to intervene for manual settings.

The legacy-free design utilizes the Plug and Play approach for the detection, configuration, and attachment of peripheral devices. In a Plug and Play design, before any external device is accessible to the PC, bus enumeration code must be executed. Once the bus enumeration code has executed, the code that detects, enables and attaches the peripheral device must also be executed. The system requirements needed to perform this procedure, and in particular, to perform the recognition of a USB keyboard, requires approximately 35K to 40K of memory. Since the boot-block code is limited to about 8K of memory, there is not enough space in the boot block to connect such a device. In contrast, the old legacy design typically stored code in the boot block for the minimal initialization of a floppy disk and a PS/2 keyboard. Therefore, unlike the old legacy design which provided keyboard I/O during the execution of the boot-block code, the legacy-free design is without such a keyboard I/O during this period.

The old legacy design's immediate access both to a floppy disk and a keyboard meant that a user could request a flash of the BIOS code, or the execution of another diagnostic command, by simply inserting a disk in the disk drive or by striking the appropriate key on the keyboard during execution of the boot block code. However, the new legacy-free design does not provide access to these devices during the boot block period.

SUMMARY OF THE INVENTION

Briefly, an illustrative system provides a method, apparatus and information appliance system for adding functionality to a power button where the use of the power button controls the entry and exiting, into and out of, a diagnostic mode. Further, the system contains an information appliance connected to a diagnostic information source.

To add functionality to the power button, a feature has been added to monitor the power button. The power button is monitored at strategic or appropriate times to determine whether or not the power button is pressed. The detection of a press of the power button, depending on when that press occurred, could indicate a request for entry into, or a request for exit out of, a diagnostic mode. There are two occasions where the system monitors the power button for a press: (1) a first button press occurring subsequent to system startup, which, if detected, indicates a user request to enter a diagnostic mode, and (2) a second button press occurring after detection of a first button press (which placed the system in a diagnostic mode), which, if detected, would indicate a user request to exit the diagnostic mode.

The diagnostic mode has two phases, a first phase and a second phase. The first phase is entered upon the detection of a first button press indicating that the user wishes to enter a diagnostic mode. Once in the first phase, the system monitors the power button, along with the interface between the information appliance and the diagnostic information source, to determine whether to continue onto the second phase of the diagnostic mode or whether to exit the diagnostic mode and continue normal operations in the information appliance. The second phase is entered upon the detection of a communication from the diagnostic information source before a button press from the user indicating a desire to exit the diagnostic mode. Once the second phase begins, the diagnostic information source is allowed to transmit information to the information appliance.

The illustrative system is particularly useful when incorporated into devices with limited interface connections such as legacy-free information appliances. The system allows for a standard existing power button on the information appliance to serve diagnosis purposes, avoiding the need for initializing peripherals requiring substantial execution space.

BRIEF DESCRIPTION OF THE DRAWINGS

A better understanding of the present invention can be obtained when the following detailed description of the disclosed embodiment is considered in conjunction with the following drawings, in which.

DETAILED DESCRIPTION OF PREFERRED EMBODIMENT

The following related patent application is hereby incorporated by reference as if set forth in its entirety:

U.S. patent application, Ser. No. 09/542,220, entitled INFORMATION APPLIANCE DATA COMMUNICATION VIA AUDIO INTERFACES, filed concurrently.

Figure 1:
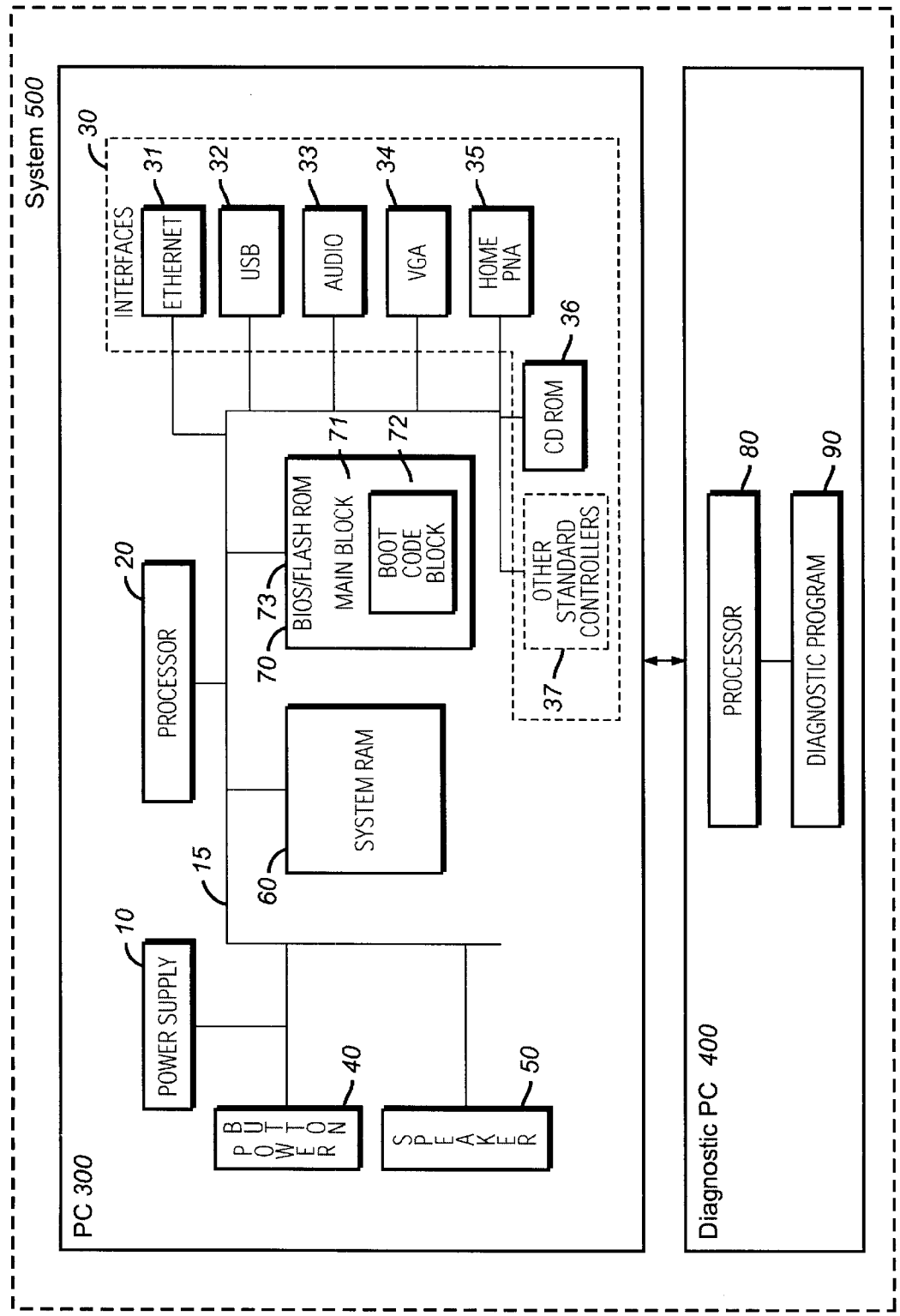
FIG. 1 is a block diagram illustrating generally the Power Button Controlled Diagnostic Mode and its operation within a system including an information appliance and a diagnostic information source along with the interaction of the components therein.
Figure 2:
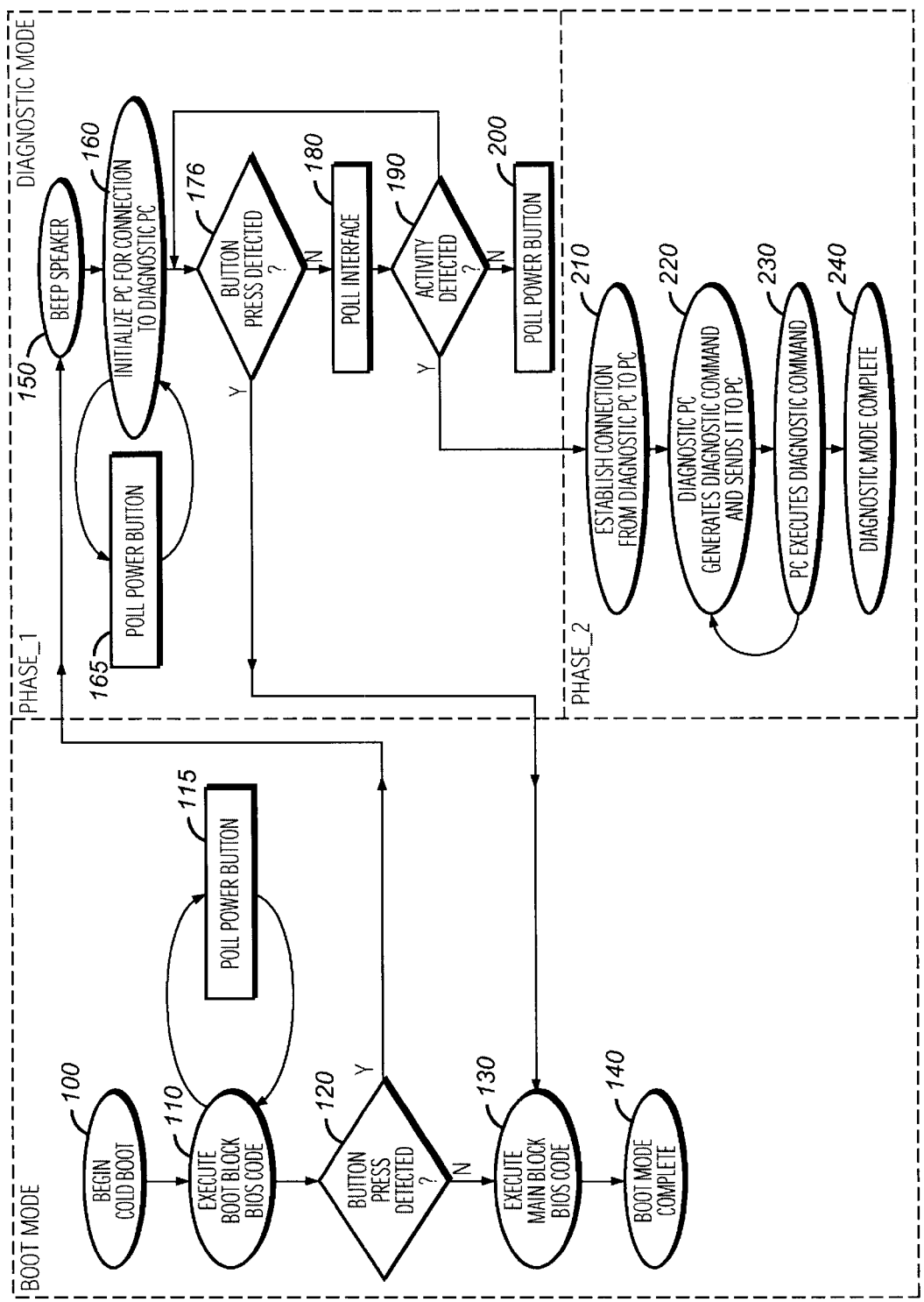
FIG. 2 is a flow diagram illustrating how the illustrative system incorporates the polling of a power button to control entry and exit into a two-phase diagnostic mode.

FIGS. 1 and 2, illustrate a typical computer system 500 implemented according to the invention. For purposes of explanation, specific embodiments are set forth to provide a thorough understanding of the present invention. However, it will be understood by one skilled in the art, from reading the disclosure, that the invention may be practiced without these details. Further, although the embodiments are described including a legacy-free PC, most, if not all, aspects of the system illustrated apply to interfacing an information appliance in combination with at least one diagnostic information source, where the information appliance contains a power button. Moreover, well-known elements, devices, process steps, and the like, are not set forth in detail in order to avoid obscuring the disclosed system.

In FIG. 1, the computer system 500 in the illustrated embodiment is made up of both a PC or information appliance 300 and a diagnostic PC or information appliance 400. The PC 300 and the diagnostic PC 400 are connected via an interface 30. It should be noted that the interface 30 can be used for communication between the PC 300 and the diagnostic PC 400 via the audio port as described in the commonly-assigned U.S. patent application Ser. No. 09/542, 220, entitled INFORMATION APPLIANCE DATA COMMUNICATION VIA AUDIO INTERFACES, filed concurrently. The diagnostic PC 400 includes a processor 80 for executing a diagnostic program 90. However, in other embodiments, the diagnostic information source is not an external PC, but rather an interfaced component or device that is capable of communicating with PC 300, including, but not limited to, CD ROMs and MP3 players. The PC 300 has a bus 15 shown in the preferred embodiment as a PCI bus. However, buses of other types may be used including a Universal Serial Bus (USB) or an Institute of Electrical and Electronics Engineers (IEEE) 1394 Standard High Performance Serial Bus. Bus 15 connects to it the following components: power supply 10, processor 20, interfaces 30, power button 40, speaker 50, system RAM 60, and flash ROM 70. The interfaces 30 contains a variety of interface controllers, all of which are understood to those in the art, including Ethernet controller 31, USB controller 32, audio port 33, VGA (video graphics adapter) controller 34, home PNA (home networking) controller 35, CD ROM 36, and other standard peripheral controllers 37. The flash ROM 70 holds BIOS code 73 which is made up of a main block 71 and a boot block 72. During a standard flashing routine, main block 71 is flashed while the boot block 72 retains its pre-flash memory values.

Referring to FIG. 2, a control flow diagram of the disclosed diagnostic techniques, a standard use power button 40 is referenced which, when pressed, controls the entry and exit from a diagnostic mode. FIG. 2 shows the two main modes: boot mode and diagnostic mode. The diagnostic mode is further divided into two phases: Phase_1 and Phase_2. In the boot mode, the PC 300 is basically under its own control. While in the diagnostics mode, the PC 300 is essentially under the control of the diagnostic PC 400. However, other embodiments may allow PC 300 to retain control of itself even after contact has been established between diagnostic PC 400 to PC 300, and in so doing, may also monitor for the press of the power button 40, and exit the diagnostic mode when such a press is detected.

The boot mode includes execution of the BIOS code 73. The boot mode begins with step 100 where a cold boot is initiated. Step 100 calls step 110 where execution of the boot block code 72 is performed. As the boot block code 72 is executed, step 115 simultaneously and continuously polls power button 40 to record any pressing of the power button 40. The process can be configured to detect pressing of the power button 40 for a predetermined period of time. Other embodiments may poll less than continuously. Yet other embodiments may implement step 115 with a status bit where that status bit is set whenever a button press has been detected. One advantage of monitoring power button 40 is to provide functionality such that a user can update or diagnose the PC 300 without requiring the availability or initialization of peripheral devices such a keyboard, floppy disk, or mouse. In certain systems, particularly legacy-free designs, the peripheral devices often require substantial execution space to initialize. Such systems often do not have enough space in their boot block 72 to hold code to initialize their peripheral devices. It should be understood that the disclosed techniques for monitoring the power button 40 can be applied to a variety of situations where a user desires to interact with a computing system without initializing peripherals requiring substantial execution space. Upon completion of step 110 and the execution of the boot block code 72, step 120 is then called. Step 120 checks to see whether step 115 detected a press of the power button 40. In those embodiments which utilize a status bit for recording a press of the power button 40, such embodiments would have step 120 check the status bit to determine if a button press had occurred. The power button 40 has either has a pressed state or unpressed state. If no detection of a press of the power button 40 is found in step 120, then step 130 is entered and the main block BIOS code 71 is executed, followed by step 140 which completes the execution of the boot mode. However, if step 120 finds that a press of power button 40 was detected in step 115, then Phase__1 of the diagnostic mode is entered. Because a bad flash of BIOS code 70 only effects the main block code 71, the boot block code 72 would still be able to initiate entry into the diagnostic mode and allow troubleshooting to take place without a need to place a call to an outside technician.

The diagnostic mode begins with Phase__1. Phase__1 represents the lead-in time for connecting the PC 300 to the diagnostic PC 400. The "lead-in time" refers to that time in which the user is allowed to reverse an earlier decision to enter the diagnostic mode by a press of power button 40. Phase__1 begins with step 150 with the beep of speaker 50 and is immediately followed by step 160 where PC 300 is initialized for connection to diagnostic PC 400. Interfacing of two PCs is described in more detail in the commonly assigned U.S. patent application, entitled INFORMATION APPLIANCE DATA COMMUNICATION VIA AUDIO INTERFACES, previously incorporated herein. The significance of the beeping of speaker 150 is to notify the user that the press of power button 40 did in fact place and PC 300 did enter the diagnostic mode. Other embodiments need not include the beeping of speaker 150. During step 160, step 165 continuously polls power button 40 for the purpose of detecting a press of the power button 40. Other embodiments may poll the power button 40 less than continuously. Upon completion of step 160, a potentially repetitive loop is initiated comprised of steps 170, 180, 190, and 200.

The first step in the repetitive loop is step 170 which will take one of two different paths depending on whether or not the process detects the press of power button 40. If a power button press is detected, then Phase__1 will be exited and the boot mode will be reentered. The boot mode is reentered at step 130 where main block code 71 is executed and is followed by a call to step 140 which completes the boot mode. If, however, step 170 does not detect a press of power button 40 then step 180 is called or executed and the interface to the diagnostic computer 400 is polled after a predetermined period of time set by a timer in an effort to determine if any communication is occurring. After step 180, step 190 is called, and depending if any activity was detected in step 190, either one of two paths is followed. If activity was detected, then Phase__1 is exited and Phase__2 is entered. If, however, no activity was detected in step 190 then step 200 is called and a poll of power button 40 is performed. Once step 200 has completed, a call to the sequence of repetitive steps of 170, 180, 190 and 200 is again initiated.

In the preferred embodiment, Phase__2 represents that portion of the diagnostic mode where diagnostic commands are executed and where a user can no longer exit the diagnostic mode by the press of power button 40. The splitting of Phase__2 from Phase__1provides for a period of time in which the user is able to exit the diagnostic mode and continue normal execution even after having initially chosen to enter the diagnostic mode. However, other embodiments may allow the exiting of the diagnostic mode during Phase__2 by a press or the power button, or other means. In the preferred embodiment, Phase__2 begins with step 210 wherein the connection between the diagnostic PC 400 and the PC 300 is established. Once the connection is complete, step 220 is called and the diagnostic PC 400 generates a diagnostic command and communicates the command to PC 300. However, other embodiments may either have PC 300 initiate the diagnostic command, or have such a command be implied by the connection to diagnostic PC 400, or may be included within the header of a stream of data sent by PC 400, or may be provided by an alternative type of diagnostic information source including such examples as a CD ROM or MP3 player. Other embodiments may allow the diagnostic command to be executed by one information appliance, component or device, for example: a command to reflash BIOS code 73 might be initiated by the information appliance needing the BIOS reflashed, while the data necessary to accomplish the command is made available by a different information appliance, component or device, for example: a new ROM image may be then supplied by an MP3 player. One example of a diagnostic command is a command to flash or update the flash ROM 70. Next, step 230 is called and PC 300 executes the diagnostic command that was sent by diagnostic PC 400 in step 220. After completion of step 230, the process then loops back to step 220 and continues to repeat the steps 220 and 230 until the diagnostic mode is completed and step 240 is called to complete the diagnostic mode.

The disclosed diagnostic techniques are particularly useful when implemented in a legacy-free environment. Since legacy-free information appliances typically lack the execution space to initialize most peripherals during execution of the boot block 72, the steps described in FIG. 2, which do not require the peripherals, but rather only require power button 40, allow legacy-free systems to be diagnosed or updated without access to typical peripherals.

The disclosed operation occurring in relation to the execution of any particular type of code, including in relation to any BIOS code, is only exemplary and illustrative. Accordingly, it should be appreciated by those skilled in the art that the disclosed diagnostic techniques could be operative in various times and states throughout the operation of an information appliance and need not occur at or near the time of execution of any BIOS code. Based on the disclosed diagnostic mode, it should be understood that other ways of entering and exiting the diagnostic mode utilizing the power button, as well as other operations occurring within the diagnostic mode, as well as different operations occurring within a boot mode, could each or all be implemented without departing from the spirit of the invention. Further, it should be appreciated by those skilled in the art that disclosed diagnostic techniques, which utilize signals communicated through use of a power button for the entry and exit from a diagnostic mode, may differ depending upon the design nature of the particular information appliance at hand, the particular purpose of the diagnostic mode, or other external design influences. For the purposes of this disclosure, an information appliance is essentially a computing system with a subset or superset of the functions or similar functions (e.g., Internet access) of a computer system. Some examples of information appliances include Internet terminals, thin clients, game machines, set-top boxes and the like. It should be understood that the disclosed diagnostic techniques extend to diagnostic functions other than updating a flash memory, such as debugging a system for example. Further, it should be understood that the methodology and use of the power button to control the entry and exit into a diagnostic mode is applicable to any information appliance utilizing a power button.

The foregoing disclosure and description of the various embodiments are illustrative and explanatory thereof, and various changes in the number of steps, step functions, step sequence, presence of repetitive steps, number of repetitive steps, repetitive step functions, repetitive step sequence, presence of polling, polling times, polling frequency, manner of polling, polling functions, polling sequence, presence of modes, number of modes, mode functions, mode sequence, presence of phases, number of phases, phase functions, and phase sequence, as well as in the details of the illustrated hardware, software and method of operation may be made without departing from the spirit of the invention.

We claim:

1. A method of using a power button of an information appliance to control entry into a diagnostic mode, wherein the information appliance is already powered up at system startup by an initial press of the power button, comprising the steps of:

monitoring the power button of the information appliance to detect a first subsequent press of the power button;

entering a diagnostic mode upon detection of the first subsequent press of the power button by the monitoring step; and bypassing a diagnostic mode absent detection of the first subsequent press of the power button.

2. The method of claim 1, the monitoring step comprising the steps of:

polling the power button when a timer reaches a predetermined time; and exiting the diagnostic mode when the polling of the power button indicates a second subsequent pressed state.

3. The method of claim 1, the entering a diagnostic mode step comprising step of:

initializing the information appliance in preparation for a communication between the information appliance and a diagnostic information source.

4. The method of claim 1, further comprising the step of:

continuing execution of BIOS code of the information appliance absent detection of the first subsequent press of the power button.

5. The method of claim 1, wherein the monitoring of the power button step occurs during execution of BIOS boot block code.

6. A method of using a power button of an information appliance to control execution in a diagnostic mode, wherein the information appliance is already in a diagnostic mode after the detection of a first subsequent press of the power button, comprising the steps of:

monitoring the power button of the information appliance to detect a second subsequent press of the power button;

monitoring an interface of the information appliance to detect communication from a diagnostic information source;

continuing in a diagnostic mode when a detection of communication from a diagnostic information source occurs before detection of the second subsequent press of the power button; and exiting a diagnostic mode when a detection of the second subsequent press of the power button occurs before the detection of communication from a diagnostic information source.

7. The method of claim 6, further comprising the step of:

establishing a connection between the information appliance and the diagnostic information source after the detection of communication from a diagnostic information source.

8. The method of claim 6, further comprising the step of:

establishing a connection between the information appliance and the diagnostic information source after the detection of communication from a diagnostic information source; and providing a diagnostic command from the diagnostic information source to the information appliance.

9. The method of claim 8, wherein the diagnostic command is a command to update the BIOS code of the information appliance.

10. The method of claim 6, further comprising the step of:

continuing execution of BIOS code when detection of the second subsequent press of the power button occurs before the detection of communication from a diagnostic information source.

11. A method of using a power button of an information appliance to control execution in a diagnostic mode of the information appliance, wherein the information appliance is already in a diagnostic mode after the detection of a first subsequent press of the power button, comprising the steps of:

monitoring the power button of the information appliance to detect a second subsequent press of the power button;

exiting a diagnostic mode of the information appliance upon detection of the second subsequent press of the power button by the monitoring step.

12. An information appliance adapted for a power button to control entry into a diagnostic mode, wherein the information appliance is already powered up by an initial press of the power button, comprising:

a processor;

a power button; and code;

wherein the processor executes code to perform the following steps:

monitoring the power button to detect a first subsequent press of the power button;

entering a diagnostic mode upon detection of the first subsequent press of the power button by the monitoring step; and bypassing diagnostic mode absent detection of the first subsequent press of the power button.

13. The information appliance of claim 12, the processor running code to perform the monitoring step including the further steps of:

polling the power button when a timer reaches a predetermined time; and exiting the diagnostic mode when the polling of the power button indicates a second subsequent pressed state.

14. The information appliance of claim 12, the processor running code to perform the entering the diagnostic mode step including the further step of:

initializing the information appliance in preparation for a connection of the information appliance with a diagnostic information source.

15. The information appliance of claim 12, the processor running code to perform the entering the diagnostic mode step including the further steps of:

beeping a speaker of the information appliance; and initializing the information appliance in preparation for a connection of the information appliance with a diagnostic information source after the beeping step.

16. The information appliance of claim 12, the processor running code to perform the further step of:

continuing execution of BIOS code of the information appliance absent detection of the first subsequent press of the power button.

17. The information appliance of claim 12, wherein the monitoring of the power button step occurs during execution of BIOS boot block code.

18. The information appliance of claim 12, wherein the information appliance is a legacy-free computer system.

19. An information appliance adapted for a power button to control execution in a diagnostic mode, wherein the information appliance is already in a diagnostic mode after the detection of a first subsequent press of the power button, comprising:
- a processor;
- a power button; and
- code;
- wherein the processor executes code to perform the following steps:
  - monitoring the information appliance power button to detect a second subsequent press;
  - monitoring the information appliance interface connections to detect communication from a diagnostic information source;
  - continuing in a diagnostic mode when the detection of communication from a diagnostic information source occurs before detection of the second subsequent press of the power button; and
  - exiting the diagnostic mode when the detection of the second subsequent press of the power button occurs before the detection of communication from a diagnostic information source.

20. The information appliance of claim 19, the processor running code to perform the further steps of:
- establishing the connection between the information appliance and the diagnostic information source after the detection of communication from a diagnostic information source.

21. The information appliance of claim 19, the processor running code to perform the further steps of:
- establishing the connection between the information appliance and the diagnostic information source after the detection of communication from a diagnostic information source; and
- providing a diagnostic command from the diagnostic information source to the information appliance.

22. The information appliance of claim 21, wherein the diagnostic command is a command to update BIOS code of the information appliance.

23. The information appliance of claim 19, the processor running code to perform the further steps of:
- continuing execution of BIOS code when detection of the second subsequent press of the power button occurs before the detection of communication from a diagnostic information source.

24. An information appliance adapted for a power button to control execution in a diagnostic mode of the information appliance, wherein the information appliance is already in a diagnostic mode after the detection of a first subsequent press of the power button, comprising:
- a processor;
- a power button; and
- code;
- wherein the processor executes code to perform the following steps:
  - monitoring the information appliance power button to detect a second subsequent press;
  - exiting the diagnostic mode of the information appliance upon detection of the second subsequent press of the power button by the monitoring step.

25. A processor readable medium, capable of being read by an information appliance, wherein the information appliance includes a power button and the information appliance is already powered up at system startup by an initial press of the power button, the processor readable medium comprising:
- code to monitor the power button of the information appliance;
- code to enter a diagnostic mode when a first subsequent press of the power button is detected; and
- code to bypass the diagnostic mode absent detection of the first subsequent press of the power button.

26. The processor readable medium of claim 25, the code to monitor a power button comprising:
- code to poll the power button when a timer reaches a predetermined time; and
- code to exit the diagnostic mode when the polling of the power button indicates a second subsequent pressed state.

27. The processor readable medium of claim 25, the code to enter a diagnostic mode comprising:
- code to initialize the information appliance in preparation for communication between the information appliance and diagnostic information source.

28. The processor readable medium of claim 25, further comprising:
- code to continue execution of BIOS code of the information appliance absent detection of the first subsequent press of the power button.

29. A processor readable medium, capable of being read by an information appliance, wherein the information appliance includes a power button and the information appliance is already in a diagnostic mode after the detection of a first subsequent press of the power button, the processor readable medium comprising:
- code to monitor the information appliance power button to detect a second subsequent press of the power button;
- code to monitor the information appliance interface connections to detect communication from a diagnostic information source;
- code to continue in a diagnostic mode when a detection of communication from a diagnostic information source occurs before detection of the second subsequent press of the power button; and
- code to exit a diagnostic mode when a detection of the second subsequent press of the power button occurs before the detection of communication from a diagnostic information source.

30. The processor readable medium of claim 29, further comprising:
- code to establish data communication between the information appliance and the diagnostic information source after the detection of a diagnostic command.

31. The processor readable medium of claim 29, further comprising:
- code to establish data communication between the information appliance and the diagnostic information source after the detection of a diagnostic command; and
- code to generate a diagnostic command from the diagnostic information source to the information appliance.

32. The processor readable medium of claim 31, wherein the diagnostic command is a command to update BIOS code of the information appliance.

33. The processor readable medium of claim 29, further comprising:

code to continue execution of BIOS code when detection of the second subsequent press of the power button occurs before the detection of communication from a diagnostic information source.

34. A processor readable medium, capable of being read by an information appliance, wherein the information appliance includes a power button and the information appliance is already in a diagnostic mode after the detection of a first subsequent press of the power button, the processor readable medium, comprising:

code to monitor the information appliance power button to detect a second subsequent press of the power button; and code to exit the diagnostic mode upon detection of the second subsequent press of the power button.

35. An information appliance adapted for a power button to control entry into a diagnostic mode, wherein the information appliance is already powered up by an initial press of the power button, comprising:

a means for monitoring the power button to detect a first subsequent press of the power button;

a means for entering a diagnostic mode upon detection of the first subsequent press of the power button; and a means for bypassing a diagnostic mode absent detection of the first subsequent press of the power button.

36. An information appliance adapted for an information appliance power button to control the execution of a diagnostic mode, wherein the information appliance is already in a diagnostic mode after the detection of a first subsequent press of the power button, the information appliance comprising:

a means for monitoring the information appliance power button to detect a second subsequent press of the power button;

a means for monitoring an interface of the information appliance to detect communication from a diagnostic information source;

a means for continuing in a diagnostic mode when a detection of communication from a diagnostic information source occurs before detection of the second subsequent press of the power button; and a means for exiting a diagnostic mode when a detection of the second subsequent press of the power button occurs before the detection of communication from a diagnostic information source.

37. An information appliance adapted for an information appliance power button to control the execution of a diagnostic mode, wherein the information appliance is already in a diagnostic mode after the detection of a first subsequent press of the power button, the information appliance comprising:

a means for monitoring the information appliance power button to detect a second subsequent press of the power button; and a means for exiting the diagnostic mode upon detection of the second subsequent press of the power button.

\* \* \* \* \*